United States Patent
Song et al.

(10) Patent No.: US 11,782,448 B2
(45) Date of Patent: Oct. 10, 2023

(54) METHOD FOR OBSTACLE DETECTION AND RECOGNITION FOR INTELLIGENT SNOW SWEEPING ROBOT

(71) Applicant: Chongqing University, Chongqing (CN)

(72) Inventors: Yongduan Song, Chongqing (CN); Ziqiang Jiang, Chongqing (CN); Shilei Tan, Chongqing (CN); Junfeng Lai, Chongqing (CN); Huan Liu, Chongqing (CN); Li Huang, Chongqing (CN); Jie Zhang, Chongqing (CN); Huan Chen, Chongqing (CN); Hong Long, Chongqing (CN); Fang Hu, Chongqing (CN); Jiangyu Wu, Chongqing (CN); Qin Hu, Chongqing (CN); Wenqi Li, Chongqing (CN)

(73) Assignee: Chongqing University, Chongqing (CN)

( * ) Notice: Subject to any disclaimer, the term of this patent is extended or adjusted under 35 U.S.C. 154(b) by 203 days.

(21) Appl. No.: 17/443,205

(22) Filed: Jul. 22, 2021

(65) Prior Publication Data
US 2022/0171395 A1 Jun. 2, 2022

(30) Foreign Application Priority Data

Nov. 27, 2020 (CN) .......................... 202011363678.8

(51) Int. Cl.
*G05D 1/02* (2020.01)
*E01H 5/04* (2006.01)
(Continued)

(52) U.S. Cl.
CPC ............. *G05D 1/0214* (2013.01); *E01H 5/04* (2013.01); *G01N 29/00* (2013.01); *G01S 15/00* (2013.01);
(Continued)

(58) Field of Classification Search
CPC .. G05D 1/0214; G05D 1/0255; G05D 1/0257; E01H 5/04; G01N 29/00; G01S 15/00
See application file for complete search history.

(56) References Cited

U.S. PATENT DOCUMENTS

2023/0014948 A1* 1/2023 Guan ..................... G06V 40/25

FOREIGN PATENT DOCUMENTS

| CN | 108852182 | * | 11/2018 |
| WO | WO 2019/104733 | * | 6/2019 |

* cited by examiner

*Primary Examiner* — Hyun D Park
*Assistant Examiner* — Lynda Dinh
(74) *Attorney, Agent, or Firm* — DLA Piper LLP (US)

(57) ABSTRACT

A method for obstacle detection and recognition for an intelligent snow sweeping robot is disclosed, comprising: 1) disposing ultrasonic sensors at a front end of the snow sweeping robot to detect distance information from an obstacle ahead; and disposing radar sensors at the front and rear of the snow sweeping robot to detect whether a creature suddenly approaches; 2) processing signals detected by each of the ultrasonic sensors and radar sensors, and calculating a forward distance of the snow sweeping robot; and 3) determining a snow cover extent of a working road, detecting a change of the distance from the obstacles, and recognizing the obstacles for conditions of an ultrasonic ranging variation ratio and a variation of the forward distance of the snow sweeping robot, a change of the signal detected by radar sensors, and a descriptive statistic of the snow cover extent within a specific time period.

1 Claim, 2 Drawing Sheets

(51) Int. Cl.
  *G01N 29/00* (2006.01)
  *G01S 5/00* (2006.01)
  *G01S 15/00* (2020.01)
(52) U.S. Cl.
  CPC ......... *G05D 1/0255* (2013.01); *G05D 1/0257* (2013.01)

METHOD FOR OBSTACLE DETECTION AND RECOGNITION FOR INTELLIGENT SNOW SWEEPING ROBOT

CROSS REFERENCE TO RELATED APPLICATION(S)

This application claims the benefit and priority to Chinese Patent Application No. 202011363678.8 filed on Nov. 27, 2020, which is herein incorporated by reference in its entirety.

TECHNICAL FIELD

The present disclosure relates to the field of intelligent robot technology, and in particular, to a method for obstacle detection and recognition for intelligent robots.

BACKGROUND ART

In winter in northern China, snow on roads often troubles our transportation. In particular, snow covering specific bends, intersections, and ramps often leads to traffic accidents, and brings many inconveniences to our production, life, and travel. Nowadays, snow removal on urban roads becomes a challenging task for municipal departments. Snow is mainly removed by using conventional snowplows or manually removed. Such methods are inefficient and labor-intensive. Therefore, it is necessary to research on intelligent snow sweeping robots.

Most of existing snow sweeping devices are operated either manually or by remote control. Such devices are less intelligent and highly dependent on a human, and people are susceptible to frostbite, fall, or accidental injury by the devices during the operation. Therefore, designing an intelligent snow sweeping robot that can eliminate and avoid unsafe factors in the environment and take specific measures to protect an operator and others has become the key to research. Accordingly, there is a need for a method that enables snow sweeping robots to actively detect and recognize obstacles during unattended operation to account for the above safety concerns.

Existing obstacle avoidance strategies for snow sweeping robots include adoption of three-dimensional laser radars that perceive environments, and combination of binocular cameras and ultrasonic sensors, among others. However, these methods suffer from technical problems such as high hardware costs and poor real-time performance of algorithms.

SUMMARY

In view of this, an object of the present disclosure is to provide a method for obstacle detection and recognition for an intelligent snow sweeping robot to solve technical problems of actively detecting and recognizing obstacles by the snow sweeping robot during operation.

The method for obstacle detection and recognition for an intelligent snow sweeping robot according to the present disclosure includes the following steps:

(1) disposing an ultrasonic sensor on each of a left side, middle, and a right side of a front end of the snow sweeping robot to detect a distance between the snow sweeping robot and an obstacle ahead by the ultrasonic sensor; and disposing a radar sensor at the front and the rear of the snow sweeping robot respectively to detect whether a creature suddenly approaches when the snow sweeping robot operates by the radar sensor;

(2) processing signals detected by each of the ultrasonic sensors and each of the radar sensors, and calculating a forward distance of the snow sweeping robot, the processing specifically comprising:

a. processing ranging data acquired by each of the ultrasonic sensors, the processing specifically comprising:

performing recursive weighted average filtering on distance data acquired by each of the ultrasonic sensors within a time period $\Delta t$, expressed as follows for a $k^{th}$ time period $\Delta t$:

$$d_k = \frac{\sum_{i=1}^{n} \rho_{ki} d_{ki}}{n}$$

wherein $d_k$ represents a $k^{th}$ ultrasonic ranging result, $d_{ki}$ represents a distance value obtained during $i^{th}$ detection within the $k^{th}$ time period $\Delta t$, $\rho_{ki}$ represents a weight value during the $i^{th}$ detection, and n represents a number of detected distance values whose reciprocal value is derived;

b. processing the signals detected by each of the radar sensors, the processing specifically comprising:

processing signal data acquired by each of the radar sensors within the $k^{th}$ time period $\Delta t$, expressed as follows:

$$m_k = \begin{cases} 1, & \text{Signals from a same radar sensor are received twice in succession} \\ 0, & \text{Signals from a same radar sensor are not received twice in succession.} \end{cases}$$

wherein $m_k$ represents a result obtained after the signal data acquired by each of the radar sensors within the $k^{th}$ time period $\Delta t$ is processed; and c. calculating the forward distance of the snow sweeping robot, the calculating specifically comprising:

preforming amplitude-limiting filtering on a forward velocity of the snow sweeping robot within the $k^{th}$ time period $\Delta t$, expressed as follows:

$$v_j = \begin{cases} v_j, & |v_j - v_{j-1}| \leq v_{res} \\ v_{j-1}, & |v_j - v_{j-1}| > v_{res} \end{cases}$$

$$S_k = \sum_{j=1}^{n} v_j t$$

wherein $v_j$ represents a forward velocity of the snow sweeping robot converted from encoder data that detects a wheel velocity of the snow sweeping robot and is read for the $j^{th}$ time, $v_{j-1}$ represents a forward velocity of the snow sweeping robot converted from encoder data that detects the wheel velocity of the snow sweeping robot and is read for the $(j-1)^{th}$ time, $v_{res}$ represents a maximum allowable deviation value between the two velocities, $S_k$ represents a forward distance of the snow sweeping robot within the $k^{th}$ time period $\Delta t$, n represents a number of times the encoder data of the snow sweeping robot is read within the time period $\Delta t$, and t represents a short time period; and (3) detecting and recognizing of obstacles, the detecting and recognizing specifically comprising:

assuming that $d_{flag}$ represents a standard safe distance, $v_{flag}$ represents a standard forward velocity of the snow sweeping robot, and $v_{differ}$ represents a threshold of a forward velocity deviation of the snow sweeping robot;

defining a descriptive statistic of a snow cover extent as follows:

$$x = \frac{\alpha}{v}$$

wherein $\alpha$ represents a scale factor, and $v$ represents a forward velocity of the snow sweeping robot, and in other words, the snow cover extent is inversely proportional to the forward velocity of the snow sweeping robot;

defining a $k^{th}$ ultrasonic ranging variation as follows:

$$y_k = \frac{|d_k - d_{k-1}|}{\Delta t}, k = 2, 3, 4 \ldots$$

defining a $k^{th}$ ultrasonic ranging variation radio as follows:

$$\beta_k = \frac{y_k}{y_{k-1}}, k = 2, 3, 4 \ldots$$

defining a $k^{th}$ variation ratio of the forward distance of the snow sweeping robot as follows:

$$\xi_k = \frac{S_k}{S_{k-1}}, k = 2, 3, 4 \ldots$$

assuming that obstacle determining conditions are as follows:

$$\begin{cases} Z_k = \frac{\beta_k}{\xi_k} \\ m_k = 1 \text{ or } 0 \end{cases}.$$

In a first situation, when any of the ultrasonic sensors has a detection distance $d > d_{flag}$ and $|v - v_{flag}| \leq v_{differ}$, it is presumed that $S_1 \approx S_2 \approx \ldots \approx S_k$ and the snow cover extent x is approximately constant, that is, the snow sweeping robot operates at a constant velocity in a section with a uniform snow cover extent, and the obstacle determining conditions are degenerated as follows:

$$\begin{cases} Z_k = \frac{\beta_k}{\xi_k} \approx \beta_k \\ m_k = 1 \text{ or } 0 \end{cases}$$

if $0.95 \leq Z_k \leq 1.05, \begin{cases} m_k = 1, \text{static creature obstacle} \\ m_k = 0, \text{static general obstacle} \end{cases}$;

if $Z_k \leq 0.95, \begin{cases} m_k = 1, \text{remote creature obstacle} \\ m_k = 0, \text{remote general obstacle} \end{cases}$; or if $Z_k \geq 1.05, \begin{cases} m_k = 1, \text{near creature obstacle} \\ m_k = 0, \text{near general obstacle} \end{cases}$.

In a second situation, when any of the ultrasonic sensors has a detection distance $d > d_{flag}$ and $v - v_{flag} > v_{differ}$, it is presumed that $S_{k+1} > S_k$ at a moment k+1, and $S_k$ and $y_k$ at a moment k are the same as those at a previous moment k−1 at which the snow sweeping robot operates at a constant velocity, and in this case, x increases, it is presumed that the snow sweeping robot enters a section with a small snow cover extent, and the obstacle determining conditions are as follows:

$$\begin{cases} Z_{k+1} = \frac{\beta_{k+1}}{\xi_{k+1}} \\ m_{k+1} = 1 \text{ or } 0 \end{cases}$$

$$Z_{k+1} = \frac{\beta_{k+1}}{\xi_{k+1}} = \frac{y_{k+1}/y_k}{s_{k+1}/s_k} = \frac{y_{k+1}}{S_{k+1}} \frac{S_k}{y_k}$$

focusing on a first fraction $y_{k+1}/S_{k+1}$ because of a second fraction $S_k/y_k \approx 1$ on the right-hand side of the equation, in this case, $S_{k+1}$ increases, and the obstacle determining conditions are as follows:

$$\begin{cases} Z_{k+1} \approx \frac{y_{k+1}}{S_{k+1}} \\ m_{k+1} = 1 \text{ or } 0 \end{cases}$$

if $0.95 \leq Z_{k+1} \leq 1.05, \begin{cases} m_{k+1} = 1, \text{static creature obstacle} \\ m_{k+1} = 0, \text{static general obstacle} \end{cases}$;

if $Z_{k+1} \leq 0.95, \begin{cases} m_{k+1} = 1, \text{remote creature obstacle} \\ m_{k+1} = 0, \text{remote general obstacle} \end{cases}$; or if $Z_{k+1} \geq 1.05, \begin{cases} m_{k+1} = 1, \text{near creature obstacle} \\ m_{k+1} = 0, \text{near general obstacle} \end{cases}$.

In a third situation, when any of the ultrasonic sensors has a detection distance $d > d_{flag}$ and $v - v_{flag} > v_{differ}$, it is presumed that $S_{2k+1} < S_{2k}$ at a moment 2k+1, and $S_{2k}$ and $y_{2k}$ at a moment 2k are the same as those at a previous moment 2k−1 at which the snow sweeping robot works at a constant velocity; and in this case, x decreases, it is presumed that the snow sweeping robot enters a section with a large snow cover extent, and the obstacle determining conditions are as follows:

$$\begin{cases} Z_{2k+1} = \frac{\beta_{2k+1}}{\xi_{2k+1}} \\ m_{2k+1} = 1 \text{ or } 0 \end{cases}$$

$$Z_{2k+1} = \frac{\beta_{2k+1}}{\xi_{2k+1}} = \frac{y_{2k+1}/y_{2k}}{s_{2k+1}/s_{2k}} = \frac{y_{2k+1}}{S_{2k+1}} \frac{S_{2k}}{y_{2k}}$$

Focusing on a first fraction $y_{2k+1}/S_{2k+1}$ because of a second fraction $S_{2k}/y_{2k} \approx 1$ on the right-hand side of the equation, in this case, $S_{2k+1}$ decreases, and the obstacle determining conditions are as follows:

$$\begin{cases} Z_{2k+1} \approx \frac{y_{2k+1}}{S_{2k+1}} \\ m_{2k+1} = 1 \text{ or } 0 \end{cases}$$

if $0.95 \leq Z_{2k+1} \leq 1.05, \begin{cases} m_{2k+1} = 1, \text{static creature obstacle} \\ m_{2k+1} = 0, \text{static general obstacle} \end{cases}$;

if $Z_{2k+1} \leq 0.95, \begin{cases} m_{2k+1} = 1, \text{remote creature obstacle} \\ m_{2k+1} = 0, \text{remote general obstacle} \end{cases}$; or -continued $$\text{if } Z_{2k+1} \geq 1.05, \begin{cases} m_{2k+1} = 1, \text{ near creature obstacle} \\ m_{2k+1} = 0, \text{ near general obstacle} \end{cases}.$$

According to the present disclosure, the following beneficial effects are obtained. The method for obstacle detection and recognition for an intelligent snow sweeping robot provided in the present disclosure can determine a snow cover extent of a working road, quickly and effectively detect obstacles, and identify them as general obstacles or creature obstacles when the snow sweeping robot autonomously operates. False detection can be prevented by multi-sensor fusion analysis which has good anti-interference performance. According to the present disclosure, a determining threshold and the number of measurements can be flexibly set through the field testing to meet an accuracy and a sensitivity of the obstacle detection and recognition under different snow cover extents and achieve a good adaptability.

DETAILED DESCRIPTION OF THE EMBODIMENTS

Figure 1:
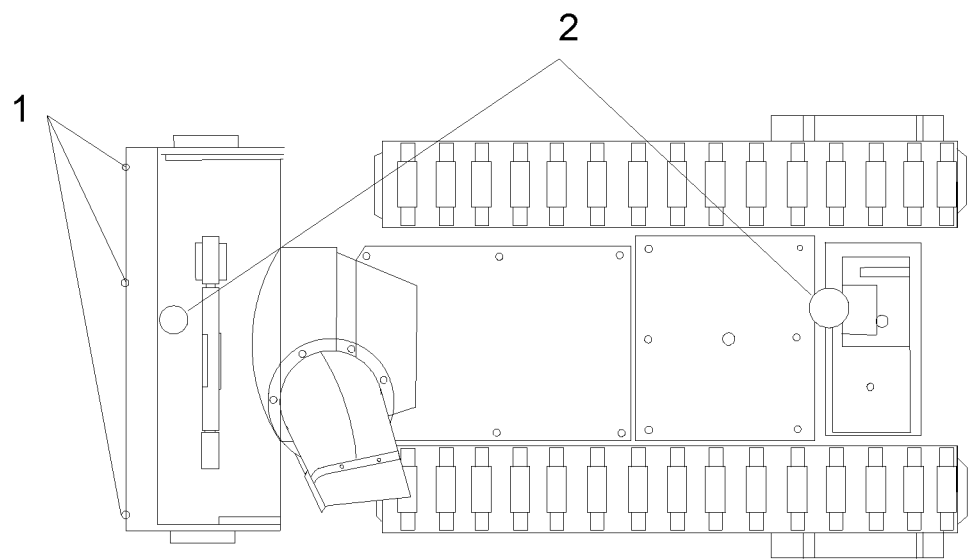
FIG. 1 is a distribution diagram of sensors of a snow sweeping robot.
Figure 2:
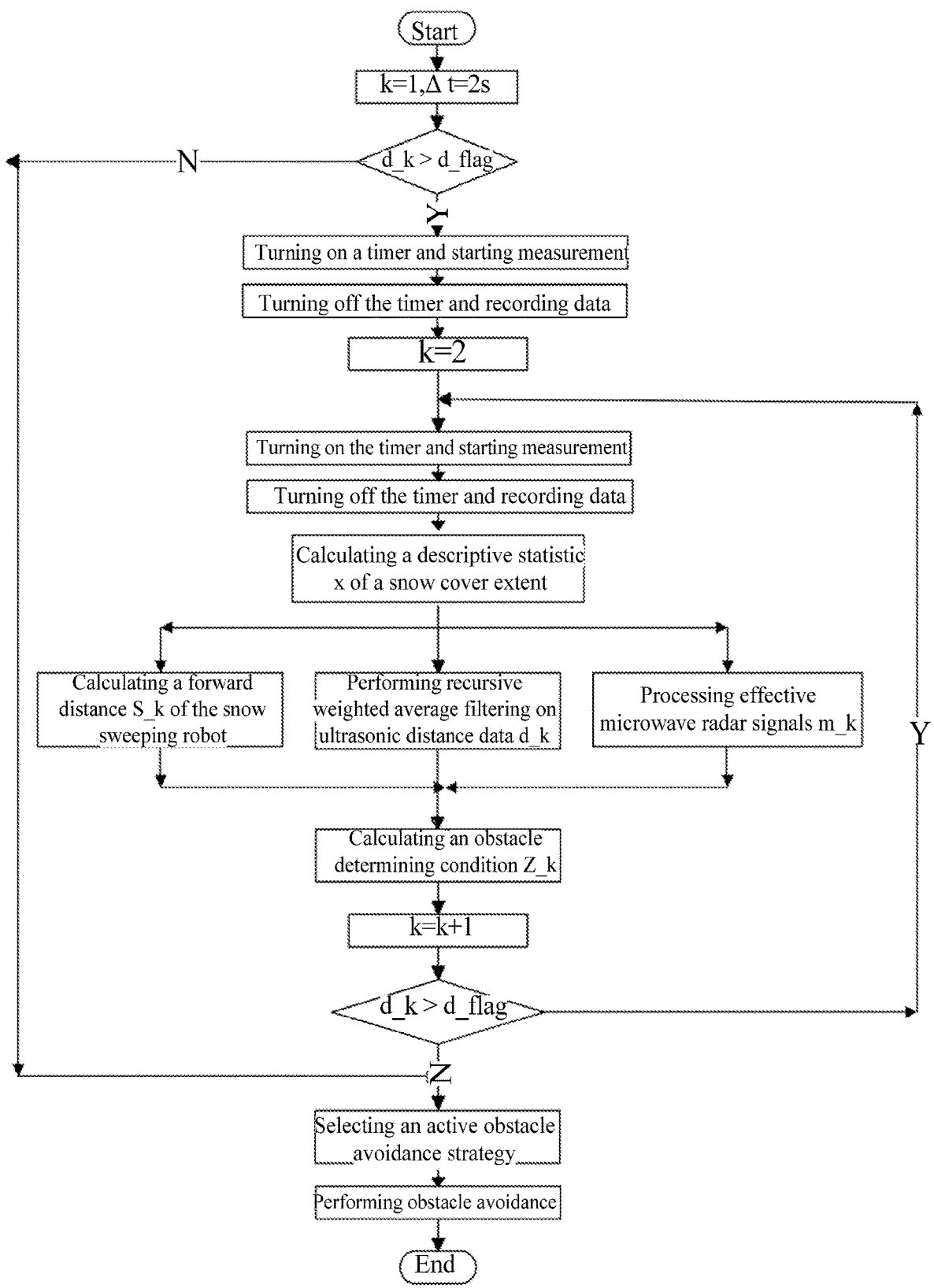
FIG. 2 is a flow chart of a method for obstacle detection and recognition for an intelligent snow sweeping robot.

The present disclosure is described in further detail below with reference to the accompanying drawings and embodiments.

A method for obstacle detection and recognition for an intelligent snow sweeping robot according to the embodiments includes the following steps:

(1) Disposing an ultrasonic sensor 1 on each of a left side, the middle, and a right side of a front end of the snow sweeping robot to detect distance between the snow sweeping robot and an obstacle ahead by the ultrasonic sensor; and disposing a radar sensor 2 at the front and the rear of the snow sweeping robot respectively to detect whether a creature suddenly approaches when the snow sweeping robot operates by the radar sensor.

(2) Processing signals detected by each of the ultrasonic sensors and each of the radar sensors, and calculating a forward distance of the snow sweeping robot, which includes the steps as follows:

a. Processing ranging data acquired by each of the ultrasonic sensors.

Performing recursive weighted average filtering on distance data acquired by each of the ultrasonic sensors within a time period $\Delta t$, expressed as follows for a $k^{th}$ time period $\Delta t$:

$$d_k = \frac{\sum_{i=1}^{n} \rho_{ki} d_{ki}}{n}$$

where $d_k$ represents a $k^{th}$ ultrasonic ranging result, $d_{ki}$ represents a distance value obtained during $i^{th}$ detection within the $k^{th}$ time period $\Delta t$, $\rho_{ki}$ represents a weight value during the $i^{th}$ detection, and n represents a number of detected distance values whose reciprocal value is derived.

b. Processing the signals detected by each of the radar sensors.

Processing signal data acquired by each of the radar sensors within the $k^{th}$ time period $\Delta t$.

$$m_k = \begin{cases} 1, \text{ Signals from a same radar sensor are received twice in succession.} \\ 0, \text{ Signals from a same radar sensor are not received twice in succession.} \end{cases}$$

where $m_k$ represents a result obtained after the signal data acquired by each of the radar sensors within the $k^{th}$ time period $\Delta t$ is processed.

c. Calculating the forward distance of the snow sweeping robot.

Performing amplitude-limiting filtering on a forward velocity of the snow sweeping robot within the $k^{th}$ time period $\Delta t$.

$$v_j = \begin{cases} v_j, & |v_j - v_{j-1}| \leq v_{res} \\ v_{j-1}, & |v_j - v_{j-1}| > v_{res} \end{cases}$$

$$S_k = \sum_{j=1}^{n} v_j t$$

where $v_j$ represents a forward velocity of the snow sweeping robot converted from encoder data that detects a wheel velocity of the snow sweeping robot and is read for the $j^{th}$ time, $v_{j-1}$ represents a forward velocity of the snow sweeping robot converted from encoder data that detects the wheel velocity of the snow sweeping robot and is read for the $(j-1)^{th}$ time, $v_{res}$ represents a maximum allowable deviation between the two velocities, $S_k$ represents a forward distance of the snow sweeping robot within the $k^{th}$ time period $\Delta t$, n represents a number of times the encoder data of the snow sweeping robot is read within the time period $\Delta t$, and t represents a short time period.

(3) Detecting and recognizing the obstacle.

Assuming that $d_{flag}$ represents a standard safe distance, $v_{flag}$ represents a standard forward velocity of the snow sweeping robot, and $v_{differ}$ represents a threshold of a forward velocity difference of the snow sweeping robot.

Defining a descriptive statistic of a snow cover extent as follows:

$$x = \frac{\alpha}{v}$$

where $\alpha$ represents a scale factor, and $v$ represents a forward velocity of the snow sweeping robot. In other words, the snow cover extent is inversely proportional to the forward velocity of the snow sweeping robot.

Defining a $k^{th}$ ultrasonic ranging variation as follows:

$$y_k = \frac{|d_k - d_{k-1}|}{\Delta t}, k = 2, 3, 4 \ldots$$

Defining a $k^{th}$ ultrasonic ranging variation radio as follows:

$$\beta_k = \frac{y_k}{y_{k-1}}, k = 2, 3, 4 \ldots$$

Defining a $k^{th}$ variation ratio of the forward distance of the snow sweeping robot as follows:

$$\xi_k = \frac{S_k}{S_{k-1}}, k = 2, 3, 4 \ldots$$

Assuming that obstacle determining conditions are as follows:

$$\begin{cases} Z_k = \frac{\beta_k}{\xi_k} \\ m_k = 1 \text{ or } 0 \end{cases}.$$

In a first situation, when any of the ultrasonic sensors has a detection distance $d > d_{flag}$ and $|v - v_{flag}| \leq v_{differ}$, it is presumed that $S_1 \approx S_2 \approx \ldots \approx S_k$ and the snow cover extent x is approximately constant, that is, the snow sweeping robot operates at a constant velocity in a section with a uniform snow cover extent. The obstacle determining conditions are degenerated as follows:

$$\begin{cases} Z_k = \frac{\beta_k}{\xi_k} \approx \beta_k \\ m_k = 1 \text{ or } 0 \end{cases}$$

if $0.95 \leq Z_k \leq 1.05$, $\begin{cases} m_k = 1, \text{ static creature obstacle} \\ m_k = 0, \text{ static general obstacle} \end{cases}$;

if $Z_k \leq 0.95$, $\begin{cases} m_k = 1, \text{ remote creature obstacle} \\ m_k = 0, \text{ remote general obstacle} \end{cases}$; or if $Z_k \geq 1.05$, $\begin{cases} m_k = 1, \text{ near creature obstacle} \\ m_k = 0, \text{ near general obstacle} \end{cases}$.

In a second situation, when any of the ultrasonic sensors has a detection distance $d > d_{flag}$ and $v - v_{flag} > v_{differ}$, it is presumed that $S_{k+1} > S_k$ at a moment k+1, and $S_k$ and $y_k$ at a moment k are the same as those at a previous moment k−1 at which the snow sweeping robot operates at a constant velocity. In this case, x increases, and it is presumed that the snow sweeping robot enters a section with a small snow cover extent. The obstacle determining conditions are as follows:

$$\begin{cases} Z_{k+1} = \frac{\beta_{k+1}}{\xi_{k+1}} \\ m_k = 1 \text{ or } 0 \end{cases}$$

$$Z_{k+1} = \frac{\beta_{k+1}}{\xi_{k+1}} = \frac{y_{k+1}/y_k}{s_{k+1}/s_k} = \frac{y_{k+1}}{S_{k+1}} \frac{S_k}{y_k}.$$

Focusing on a first fraction $y_{k+1}/S_{k+1}$ because a second fraction change $S_k/y_k \approx 1$ on the right-hand side of the equation. In this case, $S_{k+1}$ increases. The obstacle determining conditions are as follows:

$$\begin{cases} Z_{k+1} \approx \frac{y_{k+1}}{S_{k+1}} \\ m_{k+1} = 1 \text{ or } 0 \end{cases}$$

if $0.95 \leq Z_{k+1} \leq 1.05$, $\begin{cases} m_{k+1} = 1, \text{ static creature obstacle} \\ m_{k+1} = 0, \text{ static general obstacle} \end{cases}$;

if $Z_{k+1} \leq 0.95$, $\begin{cases} m_{k+1} = 1, \text{ remote creature obstacle} \\ m_{k+1} = 0, \text{ remote general obstacle} \end{cases}$; or if $Z_{k+1} \geq 1.05$, $\begin{cases} m_{k+1} = 1, \text{ near creature obstacle} \\ m_{k+1} = 0, \text{ near general obstacle} \end{cases}$.

In a third situation, when any of the ultrasonic sensors has a detection distance $d > d_{flag}$ and $v - v_{flag} > v_{differ}$, it is presumed that $S_{2k+1} < S_{2k}$ at a moment 2k+1, and $S_{2k}$ and $y_{2k}$ at a moment 2k are the same as those at a previous moment 2k−1 at which the snow sweeping robot works at a constant velocity. In this case, x decreases, and it is presumed that the snow sweeping robot enters a section with a large snow cover extent. The obstacle determining conditions are as follows:

$$\begin{cases} Z_{2k+1} = \frac{\beta_{2k+1}}{\xi_{2k+1}} \\ m_{2k+1} = 1 \text{ or } 0 \end{cases}$$

$$Z_{2k+1} = \frac{\beta_{2k+1}}{\xi_{2k+1}} = \frac{y_{2k+1}/y_{2k}}{s_{2k+1}/s_{2k}} = \frac{y_{2k+1}}{S_{2k+1}} \frac{S_{2k}}{y_{2k}}.$$

Mainly focusing on a first fraction $y_{2k+1}/S_{2k+1}$ because a second fraction change $S_{2k}/y_{2k} \approx 1$ on the right-hand side of the equation. In this case, $S_{2k+1}$ decreases. The obstacle determining conditions are as follows:

$$\begin{cases} Z_{2k+1} \approx \frac{y_{2k+1}}{S_{2k+1}} \\ m_{2k+1} = 1 \text{ or } 0 \end{cases}$$

if $0.95 \leq Z_{2k+1} \leq 1.05$, $\begin{cases} m_{2k+1} = 1, \text{ static creature obstacle} \\ m_{2k+1} = 0, \text{ static general obstacle} \end{cases}$;

if $Z_{2k+1} \leq 0.95$, $\begin{cases} m_{2k+1} = 1, \text{ remote creature obstacle} \\ m_{2k+1} = 0, \text{ remote general obstacle} \end{cases}$; or if $Z_{2k+1} \geq 1.05$, $\begin{cases} m_{2k+1} = 1, \text{ near creature obstacle} \\ m_{2k+1} = 0, \text{ near general obstacle} \end{cases}$.

In conclusion, the intelligent snow sweeping robot can quickly and effectively detect and recognize obstacles in the three different situations according to the determining conditions in each of the situations.

The method for obstacle detection and recognition for an intelligent snow sweeping robot in the embodiments can determine a snow cover extent of a working road, quickly and effectively detect obstacles, and recognize the obstacles as general obstacles or creature obstacles when the snow sweeping robot autonomously operates. False detection can be prevented by multi-sensor fusion analysis which has good anti-interference. According to the present disclosure, a determining threshold and the number of measurements can be set through the field testing to meet an accuracy and a sensitivity of obstacle detection and recognition under different snow cover extents and achieve a good adaptability.

Finally, it should be noted that the above embodiment is only intended to explain, rather than to limit, the technical solution of the present disclosure. Although the present disclosure is described in detail with reference to the preferred embodiment, those ordinarily skilled in the art should understand that modifications or equivalent substitutions made to the technical solutions of the present disclosure without departing from a spirit and scope of the technical solution of the present disclosure should be included within the scope of the claims of the present disclosure.

What is claimed is:

1. A method for obstacle detection and recognition for an intelligent snow sweeping robot, comprising the following steps:
(1) disposing a first, second, and third ultrasonic sensor on a left side, middle, and a right side of a front end of the snow sweeping robot, respectively, to detect a distance between the snow sweeping robot and an obstacle ahead by the first, second, and third ultrasonic sensors; and sweeping robot operates at a constant velocity; and in this case, x increases, the snow sweeping robot enters a section with a small snow cover extent, and the obstacle determining conditions are as follows:

$$\begin{cases} Z_{k+1} = \dfrac{\beta_{k+1}}{\xi_{k+1}} \\ m_{k+1} = 1 \text{ or } 0 \end{cases}$$

$$Z_{k+1} = \dfrac{\beta_{k+1}}{\xi_{k+1}} = \dfrac{y_{k+1}/y_k}{s_{k+1}/s_k} = \dfrac{y_{k+1}}{S_{k+1}} \dfrac{S_k}{y_k}$$

focusing on a first fraction $y_{k+1}/S_{k+1}$ because of a second fraction $S_k/y_k \approx 1$ on the right-hand side of the equation, in this case, $S_{k+1}$ increases, and the obstacle determining conditions are as follows:

$$\begin{cases} Z_{k+1} \approx \dfrac{y_{k+1}}{S_{k+1}} \\ m_{k+1} = 1 \text{ or } 0 \end{cases}$$

if $0.95 \le Z_{k+1} \le 1.05$, $\begin{cases} m_{k+1} = 1, \text{ static creature obstacle} \\ m_{k+1} = 0, \text{ static general obstacle} \end{cases}$;

if $Z_{k+1} < 0.95$, $\begin{cases} m_{k+1} = 1, \text{ remote creature obstacle} \\ m_{k+1} = 0, \text{ remote general obstacle} \end{cases}$; or if $Z_{k+1} > 1.05$, $\begin{cases} m_{k+1} = 1, \text{ near creature obstacle} \\ m_{k+1} = 0, \text{ near general obstacle} \end{cases}$;

detecting that any of the ultrasonic sensors has a detection distance $d > d_{flag}$ and $v - v_{flag} > v_{differ}$, an expression of $S_{2k+1} < S_{2k}$ holds at a moment $2k+1$, and $S_{2k}$ and $y_{2k}$ at a moment $2k$ are equal to those at a previous moment $2k-1$ at which the snow sweeping robot works at a constant velocity; and in this case, x decreases, the snow sweeping robot enters a section with a large snow cover extent, and the obstacle determining conditions are as follows:

disposing a first and second radar sensor at the front and rear parts of the snow sweeping robot, respectively, to detect whether a creature suddenly approaches when the snow sweeping robot operates by the first and second radar sensors;

(2) processing signals detected by each of the first, second, and third ultrasonic sensors and each of the first and second radar sensors, and calculating a forward distance of the snow sweeping robot, comprising:

a. processing distance data detected by each ultrasonic sensor, comprising:

performing recursive weighted average filtering on distance data detected by each ultrasonic sensor within a time period $\Delta t$, expressed as follows for a $k^{th}$ time period $\Delta t$:

$$d_k = \dfrac{\sum_{i=1}^{n} \rho_{ki} d_{ki}}{n}$$

wherein $d_k$ represents a measurement for $k^{th}$ ultrasonic ranging, $d_{ki}$ represents a distance value obtained in $i^{th}$ detection within the $k^{th}$ time period $\Delta t$, $\rho_{ki}$ represents a weight value for the $i^{th}$ detection, and n represents a number of detected distance values within the $k^{th}$ time period $\Delta t$;

b. processing the signals detected by each radar sensor, comprising:

processing the signals acquired by each radar sensor within the $k^{th}$ time period $\Delta t$, expressed as follows:

$$m_k = \begin{cases} 1, & \text{Signals from a same radar sensor are received twice in succession.} \\ 0, & \text{Signals from a same radar sensor are not received twice in succession.} \end{cases}$$

wherein $m_k$ represents a result obtained after the signal acquired by the each radar sensor within the $k^{th}$ time period $\Delta t$ is processed; and c. calculating the forward distance of the snow sweeping robot, comprising:

performing amplitude-limiting filtering on forward velocities of the snow sweeping robot within the $k^{th}$ time period $\Delta t$, expressed as follows:

$$v_j = \begin{cases} v_j, & |v_j - v_{j-1}| \le v_{res} \\ v_{j-1}, & |v_j - v_{j-1}| > v_{res} \end{cases}$$

$$S_k = \sum_{j=1}^{n} v_j t$$

wherein $v_j$ represents a forward velocity of the snow sweeping robot converted from data which is read for the $j^{th}$ time from an encoder detecting a wheel velocity of the snow sweeping robot, represents a forward velocity of the snow sweeping robot converted from data which is read for the $(j-1)^{th}$ time from the encoder detecting the wheel velocity of the snow sweeping robot, $v_{res}$ represents a maximum deviation between the two velocities, $S_k$ represents a forward distance of the snow sweeping robot within the $k^{th}$ time period $\Delta t$, p represents a number of times the encoder data of the snow sweeping robot is read within the time period $\Delta t$, and t represents a short time period; and (3) detecting and recognizing the obstacle, comprising:
defining a descriptive statistic of a snow cover extent as follows:

$$x = \frac{\alpha}{v}$$

wherein $\alpha$ represents a predetermined scale factor, and $v$ represents a forward velocity of the snow sweeping robot, and in other words, the snow cover extent is inversely proportional to the forward velocity of the snow sweeping robot;

defining a measurement variation for $k^{th}$ ultrasonic ranging as follows:

$$y_k = \frac{|d_k - d_{k-1}|}{\Delta t}, k = 2, 3, 4 \ldots$$

defining a measurement variation for $k^{th}$ ultrasonic ranging as follows:

$$\beta_k = \frac{y_k}{y_{k-1}}, k = 2, 3, 4 \ldots$$

defining a variation ratio of the forward distance of the snow sweeping robot within the $k^{th}$ time period $\Delta t$ as follows:

$$\xi_k = \frac{S_k}{S_{k-1}}, k = 2, 3, 4 \ldots$$

establishing obstacle determining conditions as follows:

$$\begin{cases} Z_k = \frac{\beta_k}{\xi_k} \\ m_k = 1 \text{ or } 0 \end{cases}$$

detecting that any of the ultrasonic sensors has a detection distance $d > d_{flag}$ and $|v - v_{flag}| \leq v_{differ}$, $d_{flag}$ representing a standard safe distance, $v_{flag}$ representing a standard forward velocity of the snow sweeping robot, and $v_{differ}$ representing a threshold of a forward velocity difference of the snow sweeping robot, $S_1 \approx S_2 \approx \ldots \approx S_k$ and the snow cover extent x is approximately constant, that is, the snow sweeping robot operates at a constant velocity in a section with a uniform snow cover extent, and the obstacle determining conditions are degenerated as follows:

$$\begin{cases} Z_k = \frac{\beta_k}{\xi_k} \approx \beta_k \\ m_k = 1 \text{ or } 0 \end{cases}$$

if $0.95 \leq Z_k \leq 1.05$, $\begin{cases} m_k = 1, \text{ static creature obstacle} \\ m_k = 0, \text{ static general obstacle} \end{cases}$;

if $Z_k < 0.95$, $\begin{cases} m_k = 1, \text{ remote creature obstacle} \\ m_k = 0, \text{ remote general obstacle} \end{cases}$; or if $Z_k > 1.05$, $\begin{cases} m_k = 1, \text{ near creature obstacle} \\ m_k = 0, \text{ near general obstacle} \end{cases}$;

detecting that any of the ultrasonic sensors has a detection distance $d > d_{flag}$ and $v - v_{flag} > v_{differ}$, an expression of $S_{k+1} > S_k$ holds at a moment k+1, and $S_k$ and $y_k$ at a moment k are equal to those at a previous moment k−1 at which the snow $$\begin{cases} Z_{2k+1} = \frac{\beta_{2k+1}}{\xi_{2k+1}} \\ m_{2k+1} = 1 \text{ or } 0 \end{cases}$$

$$Z_{2k+1} = \frac{\beta_{2k+1}}{\xi_{2k+1}} = \frac{y_{2k+1}/y_{2k}}{s_{2k+1}/s_{2k}} = \frac{y_{2k+1}}{S_{2k+1}} \frac{S_{2k}}{y_{2k}}$$

focusing on a first fraction $y_{2k+1}/S_{2k+1}$ because of a second fraction $S_{2k}/y_{2k} \approx 1$ on the right-hand side of the equation, in this case, $S_{2k+1}$ decreases, and the obstacle determining conditions are as follows:

$$\begin{cases} Z_{2k+1} \approx \frac{y_{2k+1}}{S_{2k+1}} \\ m_{2k+1} = 1 \text{ or } 0 \end{cases}$$

if $0.95 \leq Z_{2k+1} \leq 1.05$, $\begin{cases} m_{2k+1} = 1, \text{ static creature obstacle} \\ m_{2k+1} = 0, \text{ static general obstacle} \end{cases}$;

if $Z_{2k+1} < 0.95$, $\begin{cases} m_{2k+1} = 1, \text{ remote creature obstacle} \\ m_{2k+1} = 0, \text{ remote general obstacle} \end{cases}$; or if $Z_{2k+1} > 1.05$, $\begin{cases} m_{2k+1} = 1, \text{ near creature obstacle} \\ m_{2k+1} = 0, \text{ near general obstacle} \end{cases}$.

(4) detecting that any of the ultrasonic sensors has a detection distance that is not $d > d_{flag}$;
selecting an active obstacle avoidance strategy in response to detecting the detection distance that is not $d > d_{flag}$; and
performing obstacle avoidance based on the selected active obstacle avoidance strategy.

* * * * *